United States Patent
Verbridge et al.

(12)

(10) Patent No.: US 11,772,442 B2
(45) Date of Patent: Oct. 3, 2023

(54) OFFSET STEERING AXIS KNUCKLE SYSTEM

(71) Applicant: Rivian IP Holdings, LLC, Plymouth, MI (US)

(72) Inventors: Mason Verbridge, Canton, MI (US); Max Koff, Newport Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/384,341

(22) Filed: Jul. 23, 2021

(65) Prior Publication Data

US 2023/0028928 A1 Jan. 26, 2023

(51) Int. Cl.
*B60G 3/26* (2006.01)
*B62D 7/18* (2006.01)

(52) U.S. Cl.
CPC ............... *B60G 3/265* (2013.01); *B62D 7/18* (2013.01); *B60G 2200/144* (2013.01); *B60G 2200/44* (2013.01); *B60G 2206/50* (2013.01)

(58) Field of Classification Search
CPC .............. B60G 3/265; B60G 2200/144; B60G 2200/44; B60G 2206/50; B62D 7/18
See application file for complete search history.

(56) References Cited

U.S. PATENT DOCUMENTS

| | | | | |
|---|---|---|---|---|
| 1,302,489 A * | 4/1919 | Hollis | ................... | B60B 35/109 301/124.1 |
| 2,299,241 A * | 10/1942 | Kumm | ................... | B60G 3/01 267/254 |
| 2,936,034 A * | 5/1960 | Der Lely | ................. | B60B 35/14 180/41 |
| 3,085,644 A * | 4/1963 | Der Lely | ................. | B62D 1/12 180/440 |
| 3,236,324 A * | 2/1966 | Levratto | ............ | B62D 49/0607 180/242 |
| 3,306,390 A * | 2/1967 | Georges | ................. | B62D 61/12 180/41 |

(Continued)

FOREIGN PATENT DOCUMENTS

| | | |
|---|---|---|
| DE | 3718137 A1 | 12/1988 |
| DE | 4421589 C1 | 12/1995 |

(Continued)

*Primary Examiner* — Drew J Brown
*Assistant Examiner* — Timothy Wilhelm
(74) *Attorney, Agent, or Firm* — Haley Guiliano LLP

(57) ABSTRACT

A vehicle includes an assembly for providing suspension and steering for a wheel. The assembly includes an inner knuckle and a steering knuckle. The inner knuckle is coupled to an upper control arm at an upper joint and a lower control arm at a lower joint, forming a double wishbone suspension. The upper joint and the lower joint define a first axis. The steering knuckle is coupled to the inner knuckle at a steering joint that forms or otherwise defines a kingpin axis. The steering joint includes a revolute joint, a ball joint, or both. The steering knuckle is configured to be engaged with a tie-rod coupled to a steering mechanism. The kingpin axis is nearer a center of the wheel than the first axis, thus preventing or otherwise limiting torque steer. The upper and lower joints are constrained from significant steering rotation by suitable bushings, anti-steer arms, or both.

19 Claims, 9 Drawing Sheets

(56) References Cited

U.S. PATENT DOCUMENTS

| | | | | |
|---|---|---|---|---|
| 3,467,421 A | | 9/1969 | Bentley | |
| 3,509,957 A | * | 5/1970 | Loffler | B60G 3/24 280/124.13 |
| 3,572,458 A | * | 3/1971 | Tax | B62D 7/02 180/411 |
| 3,899,037 A | * | 8/1975 | Yuker | B60G 17/01925 180/41 |
| 4,003,584 A | * | 1/1977 | Zelli | B66F 11/048 280/47.11 |
| 4,241,803 A | * | 12/1980 | Lauber | B60P 3/40 280/765.1 |
| 4,363,374 A | * | 12/1982 | Richter | B62D 49/0607 180/209 |
| 4,395,191 A | * | 7/1983 | Kaiser | E02F 9/085 180/7.1 |
| 4,802,688 A | * | 2/1989 | Murakami | B60G 7/008 280/124.138 |
| 5,039,129 A | * | 8/1991 | Balmer | B60G 3/04 180/209 |
| 5,121,808 A | * | 6/1992 | Visentini | B60B 35/1018 301/128 |
| 5,137,101 A | * | 8/1992 | Schaeff | E02F 9/04 180/8.1 |
| 5,655,615 A | * | 8/1997 | Mick | B62D 49/0607 280/5.2 |
| 5,782,484 A | | 7/1998 | Kuhn | |
| 5,938,219 A | * | 8/1999 | Hayami | B60G 3/20 280/124.135 |
| 6,036,201 A | * | 3/2000 | Pond | F16F 9/06 280/5.514 |
| 6,056,304 A | * | 5/2000 | Brambilla | B60G 9/02 280/124.167 |
| 6,119,882 A | * | 9/2000 | Crook | B66F 11/046 180/906 |
| 6,199,769 B1 | | 3/2001 | Weddle | F16F 9/06 180/906 |
| 6,347,802 B1 | * | 2/2002 | Mackie | B62D 17/00 280/5.521 |
| 6,443,687 B1 | * | 9/2002 | Kaiser | E02F 9/024 180/209 |
| 6,540,243 B2 | * | 4/2003 | Takayanagi | B62K 5/08 280/778 |
| 6,726,394 B2 | * | 4/2004 | Garnier | B61F 5/24 403/135 |
| 6,752,403 B2 | * | 6/2004 | Allen | B60G 17/005 280/124.1 |
| 6,761,234 B1 | * | 7/2004 | Lamela | B62D 7/142 280/8 |
| 6,776,425 B2 | * | 8/2004 | Britton | B62D 13/06 280/103 |
| 6,783,137 B2 | * | 8/2004 | Nagreski | F16C 19/54 280/124.135 |
| 6,968,913 B1 | * | 11/2005 | Priepke | E02F 9/02 180/6.24 |
| 7,111,857 B2 | * | 9/2006 | Timoney | B60G 11/28 280/124.128 |
| 7,198,121 B2 | * | 4/2007 | Lamela | B60K 17/342 474/144 |
| 7,198,278 B2 | * | 4/2007 | Donaldson | B62D 49/08 180/209 |
| 7,294,082 B2 | * | 11/2007 | Lim | B60K 17/344 475/221 |
| 7,398,982 B2 | * | 7/2008 | Hozumi | B62D 7/18 280/124.135 |
| 7,762,372 B2 | * | 7/2010 | LeBlanc, Sr. | B62D 7/18 180/385 |
| 7,841,802 B2 | * | 11/2010 | Fockersperger, Jr. | E02F 5/102 405/184 |
| 7,862,057 B2 | * | 1/2011 | Hilmann | B62D 7/06 280/93.511 |
| 7,891,674 B2 | * | 2/2011 | Vaxelaire | B60G 21/051 280/86.758 |
| 8,051,940 B2 | * | 11/2011 | Ziech | B60K 7/0015 180/257 |
| 8,152,185 B2 | * | 4/2012 | Siebeneick | B60G 7/008 280/124.134 |
| 8,170,792 B2 | * | 5/2012 | Mizuno | B60G 17/016 701/409 |
| 8,205,900 B1 | * | 6/2012 | Moravy | B60G 3/20 280/124.138 |
| 8,267,416 B2 | * | 9/2012 | Allen | B60G 3/20 280/124.135 |
| 8,286,979 B2 | * | 10/2012 | Schote | B60G 3/20 280/124.135 |
| 8,322,729 B2 | * | 12/2012 | Michel | B60G 7/008 280/5.52 |
| 8,376,078 B2 | * | 2/2013 | Hiddema | B60B 35/001 180/209 |
| 8,490,983 B2 | * | 7/2013 | Schmid | B60G 7/006 280/5.521 |
| 8,573,615 B2 | * | 11/2013 | Kuwabara | B60G 3/20 280/124.145 |
| 8,690,177 B2 | * | 4/2014 | Buchwitz | G06F 16/245 280/124.135 |
| 9,333,824 B2 | * | 5/2016 | Zandbergen | B60G 3/20 |
| 9,387,881 B2 | * | 7/2016 | Smith | B60G 11/28 |
| 9,643,464 B2 | * | 5/2017 | Zandbergen | B60G 3/20 |
| 10,106,006 B2 | * | 10/2018 | Andou | B60G 13/005 |
| 10,160,486 B2 | * | 12/2018 | Kim | B62D 15/023 |
| 10,604,186 B2 | * | 3/2020 | Tanaka | B60G 3/20 |
| 10,745,051 B2 | * | 8/2020 | Tanaka | B62D 21/11 |
| 10,806,106 B2 | * | 10/2020 | Olson | B62D 17/00 |
| 11,192,413 B2 | * | 12/2021 | Brenner | B60G 3/20 |
| 2003/0205424 A1 | | 11/2003 | Felsing | B60K 17/342 180/242 |
| 2003/0234504 A1 | * | 12/2003 | Frantzen | B60G 3/20 280/93.512 |
| 2004/0084822 A1 | * | 5/2004 | Collyer | F16F 1/30 267/293 |
| 2005/0280241 A1 | * | 12/2005 | Bordini | B60G 3/18 280/124.135 |
| 2008/0067773 A1 | * | 3/2008 | Chalin | B60G 7/001 280/124.135 |
| 2010/0276904 A1 | * | 11/2010 | Pavuk | B60G 3/202 280/124.135 |
| 2012/0242055 A1 | * | 9/2012 | Starck | B60G 15/068 267/141 |
| 2013/0020775 A1 | * | 1/2013 | Beji | B60B 35/10 280/43 |
| 2016/0144891 A1 | * | 5/2016 | Reubens | B62D 7/06 280/93.512 |
| 2019/0283515 A1 | | 9/2019 | Paerewyck et al. | |
| 2021/0245561 A1 | * | 8/2021 | Sardes | B60G 13/005 |

FOREIGN PATENT DOCUMENTS

| | | |
|---|---|---|
| DE | 102005011135 B4 | 12/2008 |
| DE | 102017201615 A1 | 8/2018 |
| DE | 102017106810 A1 | 10/2018 |
| DE | 102017208554 A1 | 11/2018 |
| DE | 102019202185 A1 | 8/2020 |

\* cited by examiner

OFFSET STEERING AXIS KNUCKLE SYSTEM

INTRODUCTION

The present disclosure is directed to an assembly for providing suspension and steering for a vehicle, the assembly having an offset steering axis knuckle (OSAK, or steering knuckle) configured to move a steering axis nearer to a wheel centerline.

SUMMARY

The present disclosure is directed to an assembly for providing suspension and steering for a vehicle, the assembly having an offset steering axis knuckle (OSAK, or steering knuckle) configured to move a steering axis nearer to a wheel centerline. The assembly includes an inner knuckle and a steering knuckle. The inner knuckle is coupled to an upper control arm (UCA) at an upper joint and a lower control arm (LCA) at a lower joint, and the upper joint and the lower joint define a first axis. To illustrate, the UCA and LCA may form a double wishbone suspension. The steering knuckle is coupled to the inner knuckle at a steering joint, which may include a lower steering joint and an upper steering joint, that defines a kingpin axis. The steering knuckles includes a tie-rod joint configured to be engaged with a tie-rod, and a wheel interface configured to mount a wheel. The kingpin axis is nearer to the center of the wheel than the first axis (e.g., the kingpin axis is arranged between the center of the wheel and the first axis), thus reducing the effects of torque steer caused by asymmetric longitudinal loads across the axle and minimizing steering system sensitivity to wheel/tire/brake assembly imbalances. To illustrate, by arranging the kingpin axis more adjacent to the centerline of the wheel than the first axis, the affects or torque steer or bump steer may be reduced.

In some embodiments, the lower joint includes a first bushing arranged at a front portion of the lower joint and a second bushing arranged at a rear portion of the lower joint. For example, the first bushing and the second bushing may be arranged as a wide-spread bushing pair to increase mobility stiffness of the lower joint against steering. In some embodiments, the lower joint includes a lower bushing configured to provide a relatively lower conical stiffness for allowing minimal vertical wheel rate contribution. In some embodiments, the lower joint includes a lower bushing having a larger stiffness to rotation about the first axis (e.g., a vertical or near vertical axis) than rotation about a lateral axis (e.g., passing through the lower bushing). For example, in some embodiments, the lower bushing includes at least one recess, or an otherwise region of lower material stiffness, that causes the lower bushing to have the relatively larger stiffness to rotation about the first axis (e.g., a vertical or near vertical axis) than rotation about the lateral axis. In some embodiments, the upper joint includes an upper bushing having a larger stiffness to rotation about the first axis (e.g., a vertical or near vertical axis) than rotation about a lateral axis along the spindle (e.g., the upper bushing may include recesses or otherwise regions of lower material stiffness). In some embodiments, the lower joint includes a lower revolute joint, and the upper joint includes an upper revolute joint. For example, in some embodiments, the upper bushing, lower bushing, or both are configured to accommodate a change in caster during jounce and rebound of the suspension or inner knuckle thereof. In a further example, in some embodiments, the upper joint and the lower joint allow caster of the inner knuckle to vary during jounce travel of the inner knuckle while allowing steering to occur primarily or completely at the steering joint (e.g., about the kingpin axis).

In some embodiments, the assembly includes an anti-steer arm coupled to either the LCA or UCA at a first arm joint and to the inner knuckle at a second arm joint, and the anti-steer arm is configured to provide stiffness to the lower joint against rotation about the first axis (e.g., a vertical or near vertical axis). In some embodiments, the assembly includes an anti-steer arm coupled to a strut assembly at a first arm joint and to the inner knuckle at a second arm joint, and the anti-steer arm is configured to provide stiffness to the upper joint against rotation about the first axis (e.g., a vertical or near vertical axis). The anti-steer arm prevents, limits, or otherwise resists steering about the upper and lower joints, thus causing steering to primarily or entirely occur about the steering joint (e.g., about the kingpin axis).

In some embodiments, the assembly includes a strut assembly affixed to a frame, or frame element thereof, of the vehicle at a first strut joint and to the inner knuckle at a second strut joint. In some embodiments, the second strut joint is arranged above a half-shaft (also referred to as a drive shaft) coupled to the wheel. In some embodiments, the strut includes a fork configured to fit around a half-shaft coupled to the wheel, and the second strut joint is arranged below the half-shaft (e.g., coupled from the frame to the LCA or the inner knuckle). For example, in some embodiments, the assembly includes a strut assembly affixed to the frame at a first strut joint and to the lower control arm at a second strut joint. In a further example, in some embodiments, the assembly includes a strut assembly affixed to a frame element of the vehicle at a first strut joint and to the inner knuckle at a second strut joint. In some embodiments, the upper joint, the lower joint, or both are configured to provide low conical stiffness around a longitudinal axis to allow for minimal vertical wheel rate contribution to caster change with jounce travel, high conical stiffness in the horizontal plane to minimize toe compliance, and high radial stiffness to minimize camber compliance. In some embodiments, the upper joint and the lower joint are configured to limit steering of the inner knuckle to reduce the need for an anti-steer link.

In some embodiments, the steering joint includes a ball joint and a revolute joint that define the kingpin axis. In some embodiments, the steering joint includes a hole arranged in the inner knuckle and a pin assembly. The pin assembly includes a pin configured to extend through the hole of the inner knuckle to form a revolute joint, and at least one mounting feature arranged off-axis from the pin and configured to be affixed to the steering knuckle. For example, in some embodiments, the pin assembly is a bolt-on pin that allows for servicing and/or assembly of the steering knuckle and steering joint.

In some embodiments, the present disclosure is directed to a vehicle having an OSAK (e.g., a steering knuckle). The vehicle includes two front wheels, with a first control arm assembly for coupling the first front wheel to a frame, and a second control arm assembly for coupling the second front wheel to the frame. The first control arm assembly includes a first inner knuckle coupled to a first pair of control arms, and a first steering knuckle coupled to the first inner knuckle. The second control arm assembly includes a second inner knuckle coupled to a second pair of control arms, and a second steering knuckle coupled to the second inner knuckle. The first steering knuckle is configured to rotate about a first kingpin axis, and the second steering knuckle is configured to rotate about a second kingpin axis. For example, the first and second control arm assemblies form respective double wishbone suspension linkages, and the front wheels are configured to steer about the first and second kingpin axes. In some embodiments, the vehicle includes a steering assembly coupled to the first steering knuckle and the second steering knuckle by respective tie-rods. In some embodiments, the first inner knuckle is coupled to a first pair of control arms at a pair of revolute joints, and the first steering knuckle is coupled to the first inner knuckle by a revolute joint and a ball joint (e.g., and similarly for the second control arm assembly).

In some embodiments, the present disclosure is directed to a system including upper control arm (UCA), a lower control arm (LCA), an inner knuckle, and a steering knuckle. The UCA is configured to rotate about a first joint with a frame, and the LCA is configured to rotate about a second joint with the frame. The inner knuckle forms an upper joint with the UCA and forms a lower joint with the LCA. To illustrate, the inner knuckle, UCA and LCA form a double wishbone suspension arrangement. The steering knuckle is coupled to the inner knuckle at a steering joint that defines a kingpin axis. The steering knuckle is configured to interface to a wheel, and includes a tie-rod joint configured to be engaged with a tie-rod for steering the wheel. In some embodiments, the lower joint includes a bushing or a bushing pair having a larger stiffness to rotation about the first axis (e.g., a vertical or near vertical axis) than rotation about a lateral axis (e.g., passing through the bushing or bushing pair), to prevent or otherwise limit steering about the lower joint.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to a double wishbone suspension system having an offset steering axis knuckle (OSAK) configured to move a steering axis nearer to a wheel centerline. For example, an inner knuckle and steering knuckle are coupled to a pair of control arms at suitable outboard joints to prevent or limit steering at the outboard joints of the control arms. While other designs include a virtual ball joint type or other strut type suspension instead of a double wishbone, the systems of the present disclosure allow steering and suspension behavior to be tuned separately (e.g., including the benefits of the OSAK and the double wishbone suspension).

Figure 2:
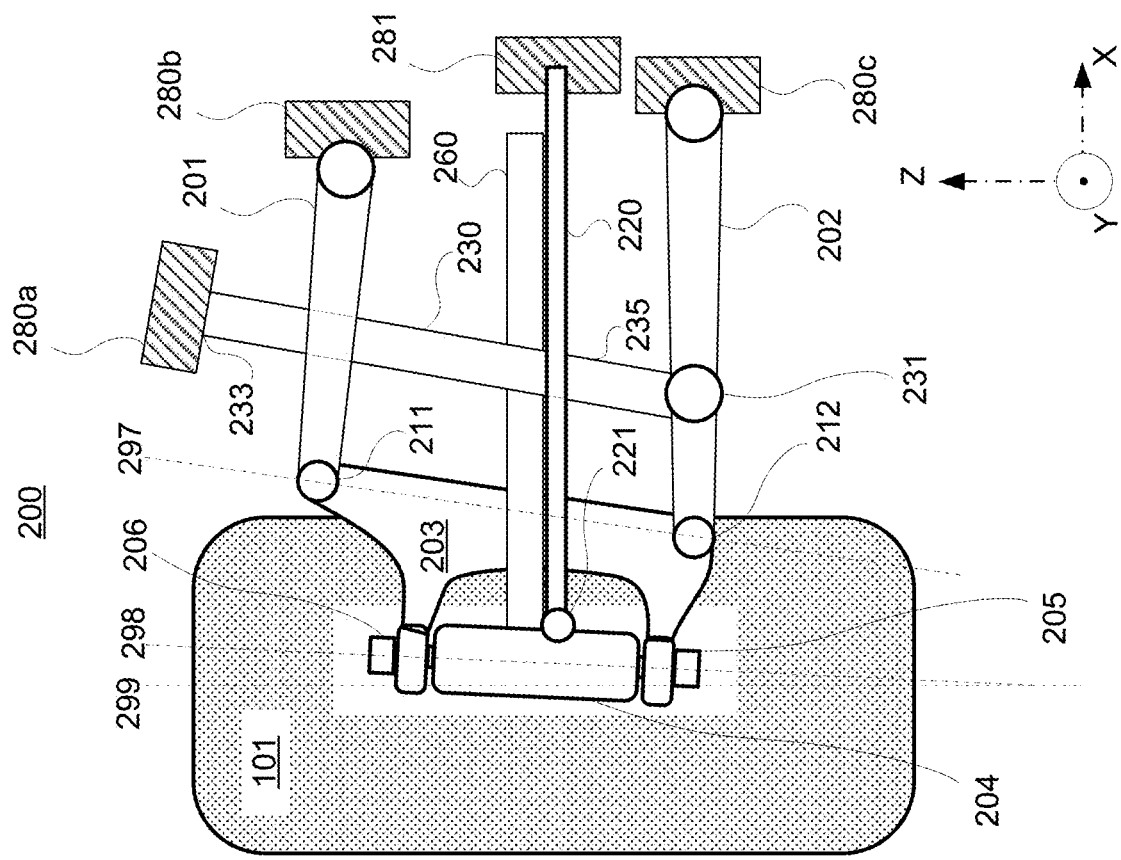
FIG. 2 shows a front view of an illustrative wheel and chassis assembly of the vehicle of FIG. 1, in accordance with some embodiments of the present disclosure.
Figure 1:
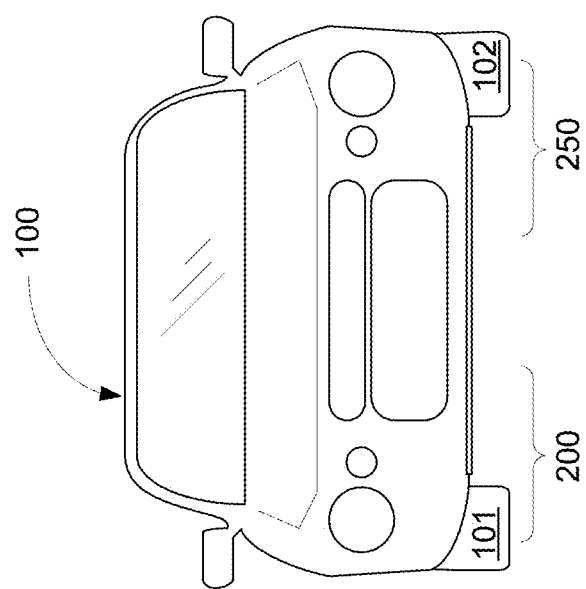
FIG. 1 shows a front view of an illustrative vehicle having an offset steering axis knuckle, in accordance with some embodiments of the present disclosure.

FIG. 1 shows a front view of illustrative vehicle 100 having an offset steering axis knuckle (e.g., illustrated by steering knuckle 204), in accordance with some embodiments of the present disclosure. FIG. 2 shows a front view of an illustrative wheel and chassis assembly of vehicle 100 of FIG. 1, in accordance with some embodiments of the present disclosure. Vehicle 100 includes front wheels 101 and 102 as illustrated in FIG. 1, each having chassis assembly 200 as illustrated for wheel 101 in FIG. 2 (e.g., a similar chassis structure exists for wheel 102, approximately mirrored about the center of vehicle 100). As illustrated, no driveshaft or half-shaft is illustrated in FIGS. 1-2. It will be understood that chassis assembly 200 may be applied to driven wheels (e.g., having a drive shaft or half-shaft coupled by a bearing and/or a joint to steering knuckle 204).

Chassis assembly 200 includes upper control arm (UCA) 201, lower control arm (LCA) 202, inner knuckle 203, steering knuckle 204, couplings 205 and 206 (e.g., defining the kingpin axis illustrated as axis 298), tie rod 220, strut assembly 230, and any other suitable components (not shown). Upper joint 211 couples UCA 201 to inner knuckle 203, and may include, for example, a ball joint (e.g., allowing more than one rotational degree of freedom) or a revolute joint (e.g., allowing only a single rotational degree of freedom). Lower joint 212 couples LCA 202 to inner knuckle 203, and may include, for example, a ball joint (e.g., allowing more than one rotational degree of freedom) or a revolute joint (e.g., allowing only a single rotational degree of freedom). Joint 221 couples tie-rod 220 to steering knuckle 204, and may include, for example, a ball joint (e.g., allowing more than one rotational degree of freedom) or a revolute joint (e.g., allowing only a single rotational degree of freedom). Vehicle 100 includes a frame (e.g., including frame elements 280a-280c, which may be the same or different) and a steering mechanism 281, which may include a rack and pinion, linkages (e.g., an Idler arm, Pitman arm, and/or other linkages), steering gear, actuator, and any other suitable components connected to tie-rod 220 for steering wheel 101 about axis 298. To illustrate, UCA 201 and LCA 202 may each interface to respective frame elements 280*b* and 280*c* by revolute joints (e.g., having one, two, or more than two bushings), ball joints, otherwise flexible joints, or a combination thereof. Couplings 205 and 206, which need not be separate fasteners, couple steering knuckle 204 to inner knuckle 203, allowing rotation about axis 298. Couplings 205 and 206 may each include a ball joint, a revolute joint, or an otherwise flexible joint. For example, one of couplings 205 or 206 (e.g., revolute joints including pins/kingpins, ball joints, or other joints) may include a ball joint while the other includes a revolute joint (e.g., to allow some change in caster angle, camber angle, or both, as wheel 101 travels during jounce and rebound (e.g., vertical or nearly vertical travel), during steering, during acceleration and braking, or otherwise during operation.

Global axes X (e.g., a lateral axis, side-to-side), Z (e.g., a vertical or nearly vertical axis), and Y (e.g., a longitudinal or nearly longitudinal axis, front-to-back) are indicated in FIG. 2 for reference. Axes 297, 298, and 299 are also illustrated in FIG. 2 for reference. Axis 297 corresponds to an axis through upper joint 211 and lower joint 212 (e.g., a potential non-offset steering axis), axis 298 corresponds to a kingpin axis (e.g., the offset steering axis), and axis 299 corresponds to a wheel centerline (e.g., a vertical or near vertical line passing through a geometric center of the wheel). To illustrate, in absence of steering knuckle 204, inner knuckle 203 would need to pivot about axis 297 to provide steering of wheel 101, which would incur torque steering or bump steering effects. For example, the OSAK illustrated by steering knuckle 204 forming axis 298) may greatly reduce torque steer effects induced by, for example, high-powered front wheel drive architectures by significantly reducing the distance from the kingpin axis (e.g., axis 298) to the wheel centerline (e.g., along axis 299), as compared to the distance between axes 297 and 299. The ability to provide steering about axis 298, and the corresponding reduction in distance between axis 299 and the steering axis (axis 298), decreases the steering torque induced by longitudinal loads (e.g., propulsive forces) that are applied at the center of wheel 101. For example, because the OSAK reduces the steering torque created by longitudinal forces, it may also reduce the reaction forces required by the tie rods that counter the steering torque. This reduction in tie-rod reaction forces allows for a smaller diameter, and thus lighter, tie-rod as compared to a non-OSAK suspension geometry. In a further example, the use of an OSAK may also reduce the sensitivity of vehicle 100 to brake, wheel, or tire nonuniformities and imbalances by reducing the moment arm to the kingpin/steering axis (e.g., axis 298, as illustrated). Accordingly, this improves ride comfort as it relates to steering wheel vibration and oscillation.

In an illustrative example, the use of an OSAK with a double-wishbone suspension architecture (e.g., UCA 201 and LCA 202) locates the steering axis (e.g., from axis 297) to a new set of points (e.g., defining axis 298) that are independent from the upper and lower outboard joints (e.g., upper joint 211 and lower joint 212) that are typically associated with a double wishbone suspension. In doing so, suspension articulation behavior may be separated from steering behavior, allowing each to be optimized, specified, or modified without effecting the other. In some embodiments, the design of the outer upper and lower wishbone joints (e.g., upper joint 211 and lower joint 212) is compatible with the location of axis 298. For example, if the steering joint were located at upper joint 211 and lower joint 212, the design may include ball joints with a bushing joint design that provides low conical stiffness around the global Z axis (e.g., allowing for minimal vertical wheel rate contribution to caster change with jounce travel), while maintaining high conical stiffness in the Y plane (e.g., to minimize toe compliance) and high radial stiffness (e.g., to minimize camber compliance). In a further example, the outboard control arm joints (e.g., upper joint 211 and lower joint 212) may be configured to limit steering of inner knuckle 203 (e.g., limit rotation about axis 297), thereby eliminating or otherwise reducing the need for an "anti-steer link" or strut arrangement that cannot rotate. In some embodiments, an anti-steer link or arm may be included to prevent rotation of inner knuckle 203 about axis 297. The use of an OSAK may allow for a reduction in the kingpin offset (e.g., the distance between axes 298 and 299 such as the range or average value) while retaining the properties of a double wishbone suspension architecture. To illustrate, the use of OSAK may provide for improved ride comfort and handling kinematics (e.g., as compared to a strut). To illustrate further, the suspensions of the present disclosure may be used to modify the steering axis, creating a smaller tire envelope for the same steering condition as compared to a virtual kingpin axis design.

In a further illustrative example, vehicle 100 may include a first control arm assembly (e.g., of chassis assembly 200) for coupling wheel 101 to a frame (e.g., including frame elements 280*a*-280*c*), and a second control arm assembly (e.g., similarly of chassis assembly 200, but mirrored) for coupling wheel 102 to a frame (e.g., including frame elements 280*a*-280*c*). Each control arm assembly includes a respective inner knuckle (e.g., inner knuckle 203) coupled to a first pair of control arms (e.g., UCA 201 and LCA 202), and a respective steering knuckle (e.g., steering knuckle 204) coupled to the respective inner knuckle. Each steering knuckle is configured to rotate about a respective kingpin axis (e.g., kingpin axis 298). In some embodiments, each inner knuckle (e.g., inner knuckle 203) is coupled to the respective pair of control arms (e.g., UCA 201 and LCA 202) at a pair of revolute joints (e.g., upper and lower joints 211 and 212), and the respective steering knuckle (e.g., steering knuckle 204) is coupled to the respective inner knuckle (e.g., inner knuckle 203) by a revolute joint and a ball joint (e.g., couplings 205 and 206, which may include any suitable steering joints). In some embodiments, vehicle 100 includes a steering assembly (e.g., steering mechanism 281) coupled to each steering knuckle (e.g., steering knuckle 204) by respective tie-rods (e.g., tie-rod 220).

In a further illustrative example, as illustrated in FIG. 2, strut assembly 230 includes fork 235 (e.g., a forked section) configured to fit around the half-shaft (e.g., drive shaft 260), and strut joint 231 is arranged below the half-shaft (e.g., drive shaft 260). Strut joint 233 couples strut assembly 230 to the frame (e.g., frame element 280*a* thereof), and may allow strut assembly 230 to pivot or rotate as wheel 101 travels (e.g., during jounce and rebound). In some embodiments, not illustrated in FIG. 2, strut assembly 230 is affixed to frame element 280*a* of the vehicle at first strut joint 233 and to inner knuckle 203 at a second strut joint (not shown), rather than to lower control arm 202 at strut joint 231 (e.g., strut joint 231 may be at inner knuckle 203).

In some embodiments, an assembly for a vehicle (e.g., chassis assembly 200) includes an inner knuckle (e.g., inner knuckle 203) and a steering knuckle (e.g., steering knuckle 204). The inner knuckle (e.g., inner knuckle 203) is coupled at an upper joint and at a lower joint (e.g., upper joint 211 and lower joint 212) defining a first axis (e.g., axis 297). The steering knuckle (e.g., steering knuckle 204) is coupled to the inner knuckle (e.g., inner knuckle 203) at a steering joint that defines a kingpin axis (e.g., couplings 205 and 206 define axis 298), wherein the kingpin axis (e.g., axis 298) passes through the steering knuckle (e.g., steering knuckle 204) between a centerline of a vehicle wheel (e.g., along axis 299) and the first axis (e.g., axis 297). To illustrated, the kingpin axis (e.g., axis 298) is nearer to (e.g., adjacent to or otherwise more adjacent to) the wheel centerline (e.g., along axis 299) than the first axis (e.g., axis 297). In some embodiments, the steering joint (e.g., couplings 205 and 206) includes a ball joint and a revolute joint that define the kingpin axis (e.g., axis 298).

In an illustrative example, lower joint 212 includes one or more bushings. For example, lower joint 212 may include a first bushing arranged at a front portion of lower joint 212, and a second bushing arranged at a rear portion of lower joint 212. To illustrate, upper joint 211 may also include one or more bushings, which may be, but need not be, the same as lower joint 212. In a further example, either or both of lower joint 212 and upper joint 211 may include a bushing configured to provide a relatively lower conical stiffness for allowing minimal vertical wheel rate contribution. In a further example, either or both of lower joint 212 and upper joint 211 may include a bushing having at least one recess that causes the bushing to have the greater stiffness to rotation about axis 297 than rotation about a lateral axis passing through the lower bushing (e.g., parallel to the X axis). Either or both of lower joint 212 and upper joint 211 may include a revolute joint. In some embodiments, upper joint 211, lower joint 212, or both are configured to provide low conical stiffness around a longitudinal axis (e.g., parallel to axis Y) to allow for minimal vertical wheel rate contribution to caster change with jounce travel, high conical stiffness in the horizontal plane (e.g., X-Y plane) to minimize toe compliance, high radial stiffness (e.g., material stiffness against radial displacement from the axis of rotation) to minimize camber compliance, or a combination thereof. In some embodiments, upper joint 211 and the lower joint 212 are configured to limit steering of inner knuckle 203 (e.g., about axis 297) to reduce the need for an anti-steer link.

Figure 3:
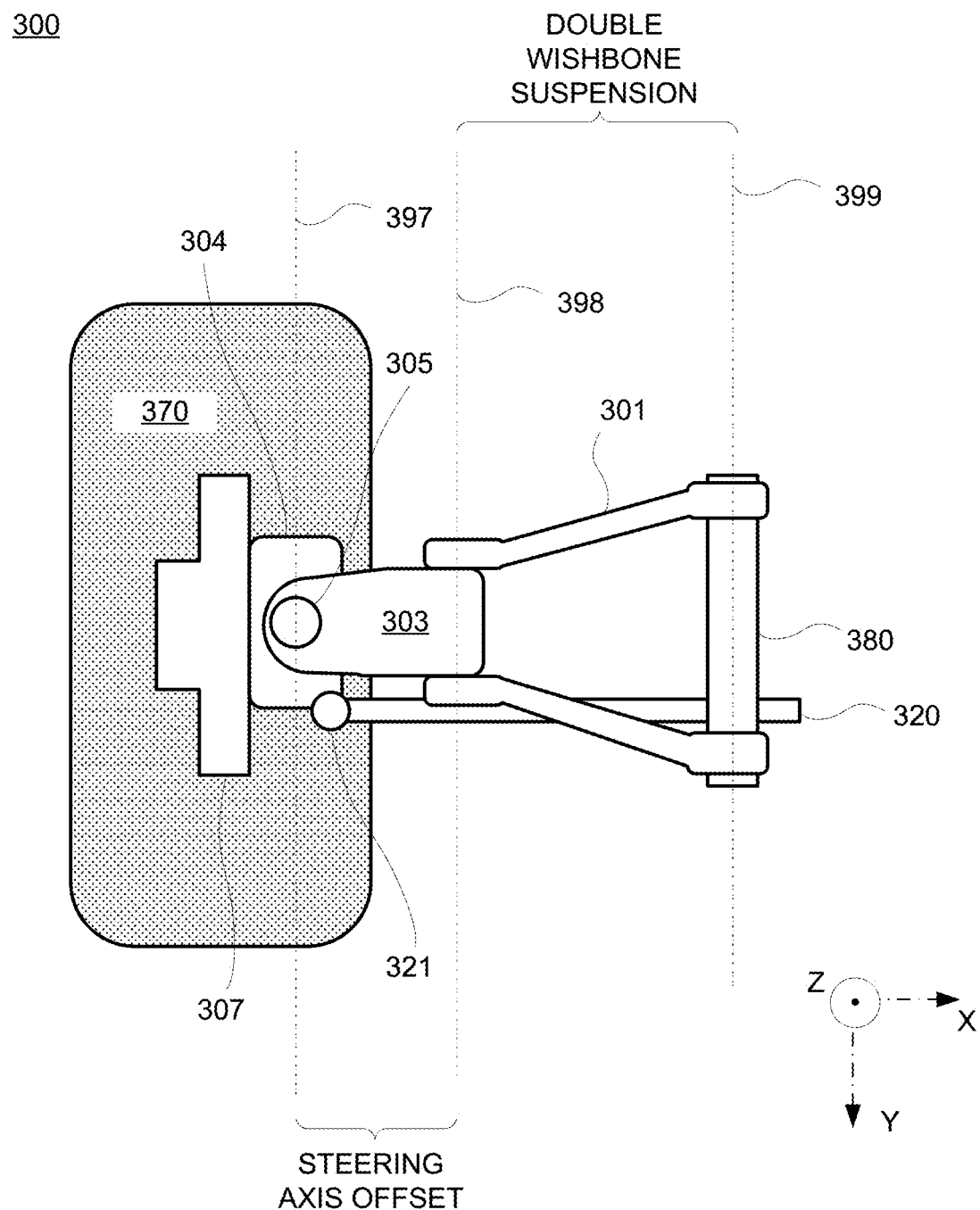
FIG. 3 shows a top view of an illustrative assembly having an offset steering axis knuckle, in accordance with some embodiments of the present disclosure.

FIG. 3 shows a top view of illustrative assembly 300 having an offset steering axis knuckle (e.g., steering knuckle 304), in accordance with some embodiments of the present disclosure. Assembly 300 may be the same as, similar to, or otherwise include some of the same components as chassis assembly 200 of FIG. 2. As illustrated in FIG. 3, assembly 300 is part of the chassis of a vehicle (e.g., vehicle 100 of FIG. 1), and includes a pair of control arms 301 forming a double wishbone suspension (e.g., only the UCA is visible as the LCA is arranged beneath the UCA in FIG. 3), inner knuckle 303, steering knuckle 304, steering joint 305, wheel interface 307 (e.g., a wheel hub, rotor, lugs 408, and/or any other suitable components), steering assembly 320 coupled to steering knuckle 304 (e.g., at steering joint 321 by tie-rod 320), and frame 380. Each control arm of pair of control arms 301 (e.g., an upper control arm and a lower control arm) are configured to rotate about a respective axis 399 (e.g., which may be vertically aligned or not) relative to frame 380. Inner knuckle 303 is coupled to pair of control arms 301 at respective joints (e.g., upper and lower joints), which may include revolute joints (e.g., configured to allow rotation primarily about axis 398). The respective joints are configured to be stiff against steering (e.g., rotation about an axis parallel to axis Z). Steering knuckle 304 is coupled to inner knuckle 303 at steering joint 305, which is configured to allow steering (e.g., rotation about an axis parallel to axis Z) as controlled by tie-rod 320. Because steering occurs primarily at steering joint 305 rather than at the upper and lower joints, the kingpin axis is nearer the centerline of wheel 370, thus reducing the effects of torque steer.

Figure 4:
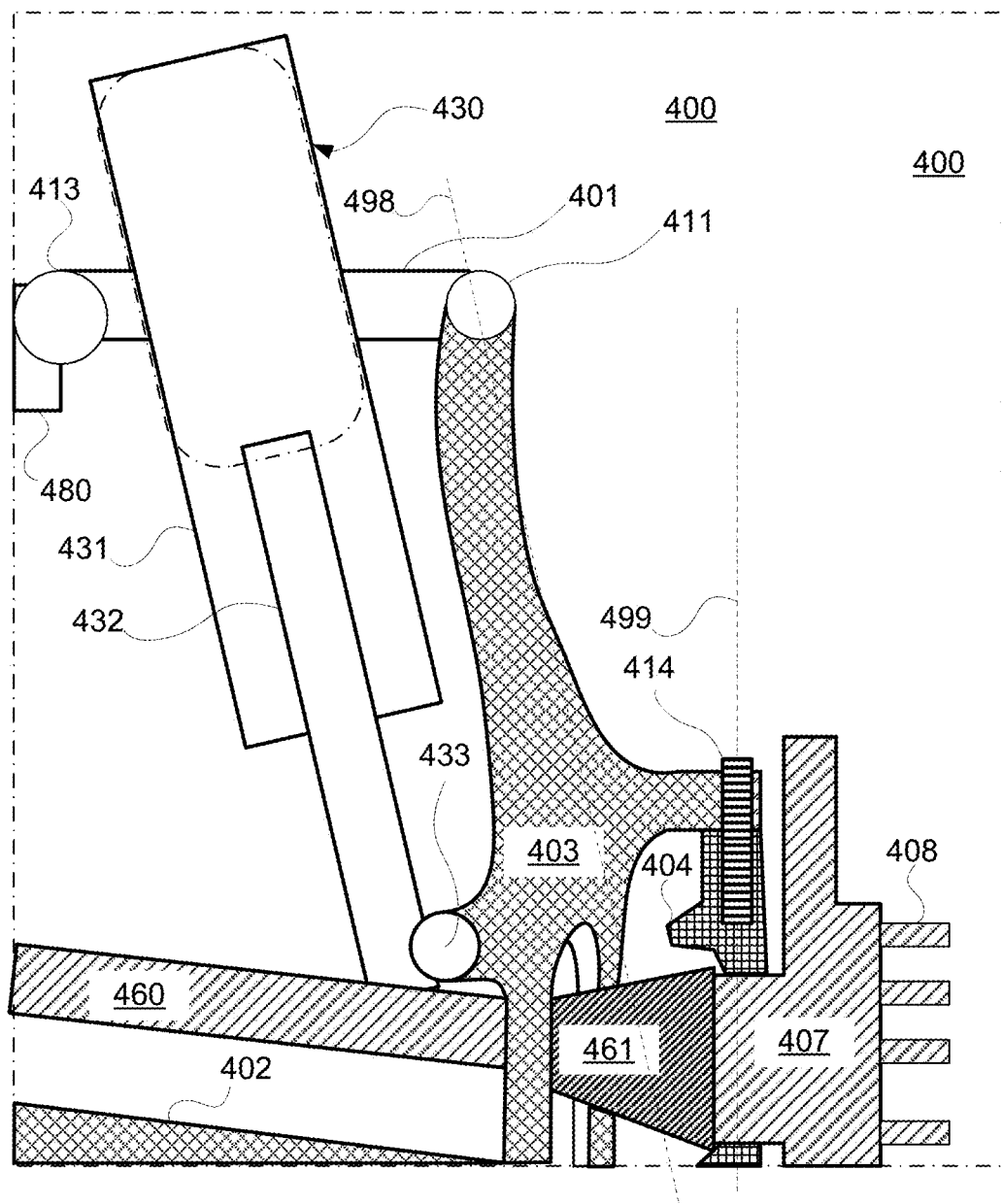
FIG. 4 shows a front view of another illustrative assembly having an offset steering axis knuckle, in accordance with some embodiments of the present disclosure.

FIG. 4 shows a front view of another illustrative assembly 400 having an offset steering axis knuckle (e.g., steering knuckle 404), in accordance with some embodiments of the present disclosure. To illustrate, assembly 400 may be the same as, or similar to, assembly 300 of FIG. 3 and chassis assembly 200 of FIG. 2, although each are shown via block diagrams that may have different shapes, tolerances, or illustrated components (e.g., some components are not illustrated in each of FIGS. 3-4). As illustrated in FIG. 4, assembly 400 is part of the chassis of a vehicle, and includes upper control arm 401, lower control arm 402 (e.g., not shown in entirety), inner knuckle 403, steering knuckle 404, steering joint 405, strut assembly 430 (e.g., including stationary element 431 and movable element 432 forming strut joint 433 with inner knuckle 403), wheel interface 407 (e.g., a wheel hub, rotor, lugs 408, and/or any other suitable components), drive shaft 460 with joint 461, and frame 480. Upper joint 411 couples UCA 401 to inner knuckle 403, and may include, for example, a ball joint (e.g., allowing more than one rotational degree of freedom) or a revolute joint (e.g., allowing only a single rotational degree of freedom). A lower joint 512 not visible in FIG. 4 couples LCA 402 to inner knuckle 403, and may include, for example, a ball joint (e.g., allowing more than one rotational degree of freedom) or a revolute joint (e.g., allowing only a single rotational degree of freedom). Upper joint 411 and the lower joint define axis 498. Upper joint 411, the lower joint, or both, may include dual wide-spread bushings or bushing pairs that may be configured to prevent, limit, or resist steering about axis 498. For example, the lengths of the LCA and UCA 401 may be tuned (e.g., optimized) for a desired camber gain curve during travel. A tie-rod (not shown in FIG. 4) may be coupled to steering knuckle 404 at a ball joint (e.g., allowing more than one rotational degree of freedom) or a revolute joint (e.g., allowing only a single rotational degree of freedom). To illustrate, UCA 401 and the LCA may each interface to frame 480 at respective joints that may be revolute joints (e.g., having one, two, or more than two bushings), ball joints, otherwise flexible joints, or a combination thereof. In an illustrative example, joint 413 may include revolute joints with bushings, while a joint between the lower control arm and frame 480 may include a ball joint and a revolute joint with bushings. Assembly 400 includes a steering joints defined by pin 414 that couple steering knuckle 404 to inner knuckle 403, allowing rotation of steering knuckle 404 about kingpin axis 499. The steering joint may include a ball joint, a revolute joint, an otherwise flexible joint, or a combination thereof (e.g., a revolute joint and a ball joint, two ball joints, or two revolute joints). For example, as illustrated, the steering joint includes a revolute joint (e.g., defined by pin 414), and another suitable joint at the interface between inner knuckle 403 and steering knuckle 404 (e.g., a ball joint), the combination of which may be configured to allow some change in caster angle, camber angle, or both, as the wheel affixed to wheel interface 407 travels during jounce and rebound (e.g., vertical or nearly vertical travel), steering, acceleration and braking, or otherwise during operation. Wheel interface 407 may include, for example, a bearing interface configured to accommodate a bearing configured for aligning drive shaft 460, a wheel, or both. Inner knuckle 403 includes a fork that extends around driveshaft 460 to affix to the LCA via a lower joint. As illustrated, strut assembly 430 is coupled to inner knuckle 403 at strut joint 433 arranged above driveshaft 460. In some embodiments, stationary element 431 may be configured to rotate or pivot about an axis or a point, but may be constrained against translation, while movable element 432 may be configured to move with inner knuckle 403 during jounce travel (e.g., strut assembly 430 may contract and expand with wheel travel). In an illustrative example showing differing mounting locations of a strut assembly, strut assembly 430 is affixed to inner knuckle 403, while strut assembly 230 of FIG. 2 is affixed to LCA 202.

Figure 5:
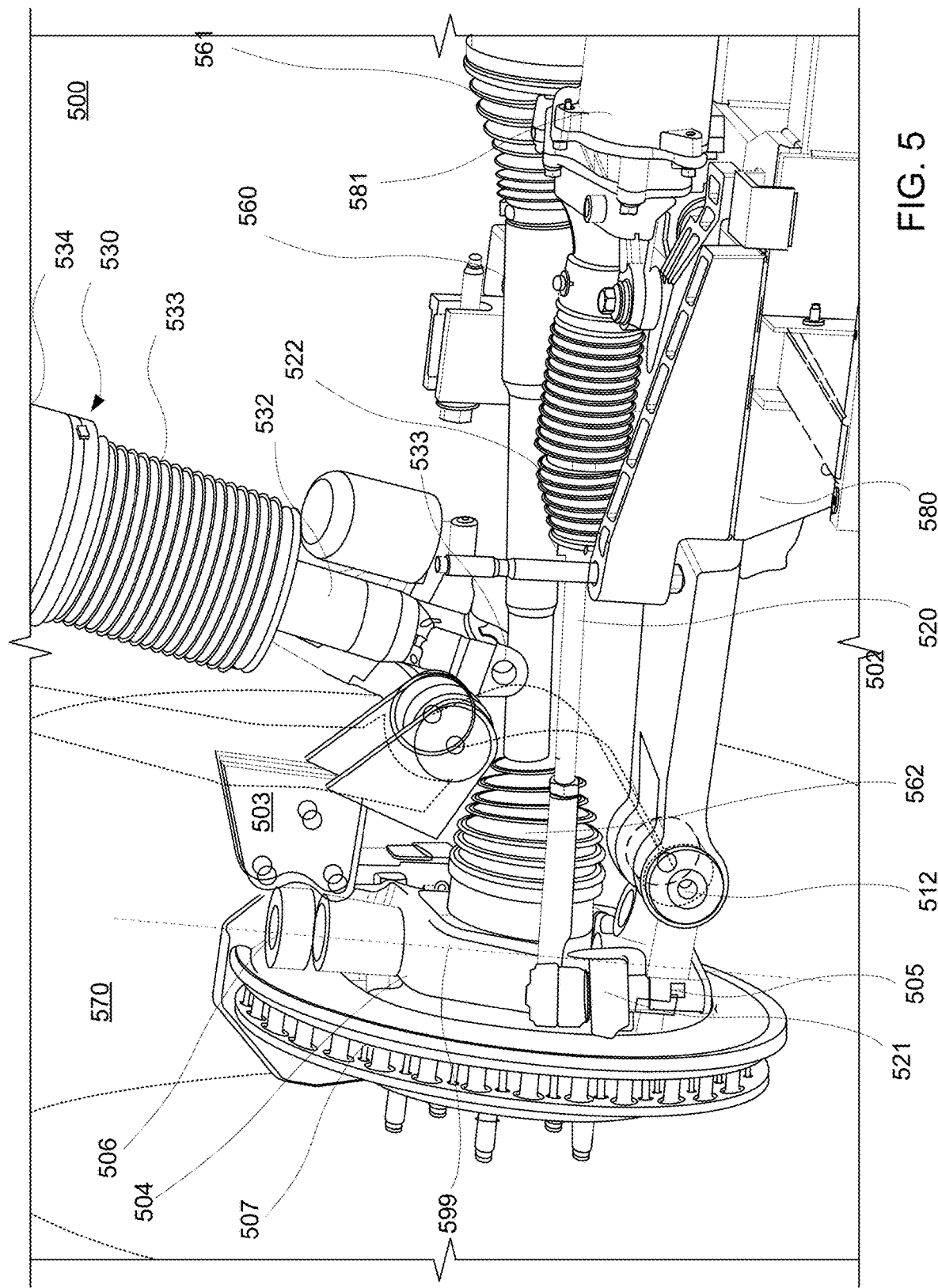
FIG. 5 shows a perspective view, from above, of a portion of an illustrative vehicle having an offset steering axis knuckle, in accordance with some embodiments of the present disclosure.
Figure 6:
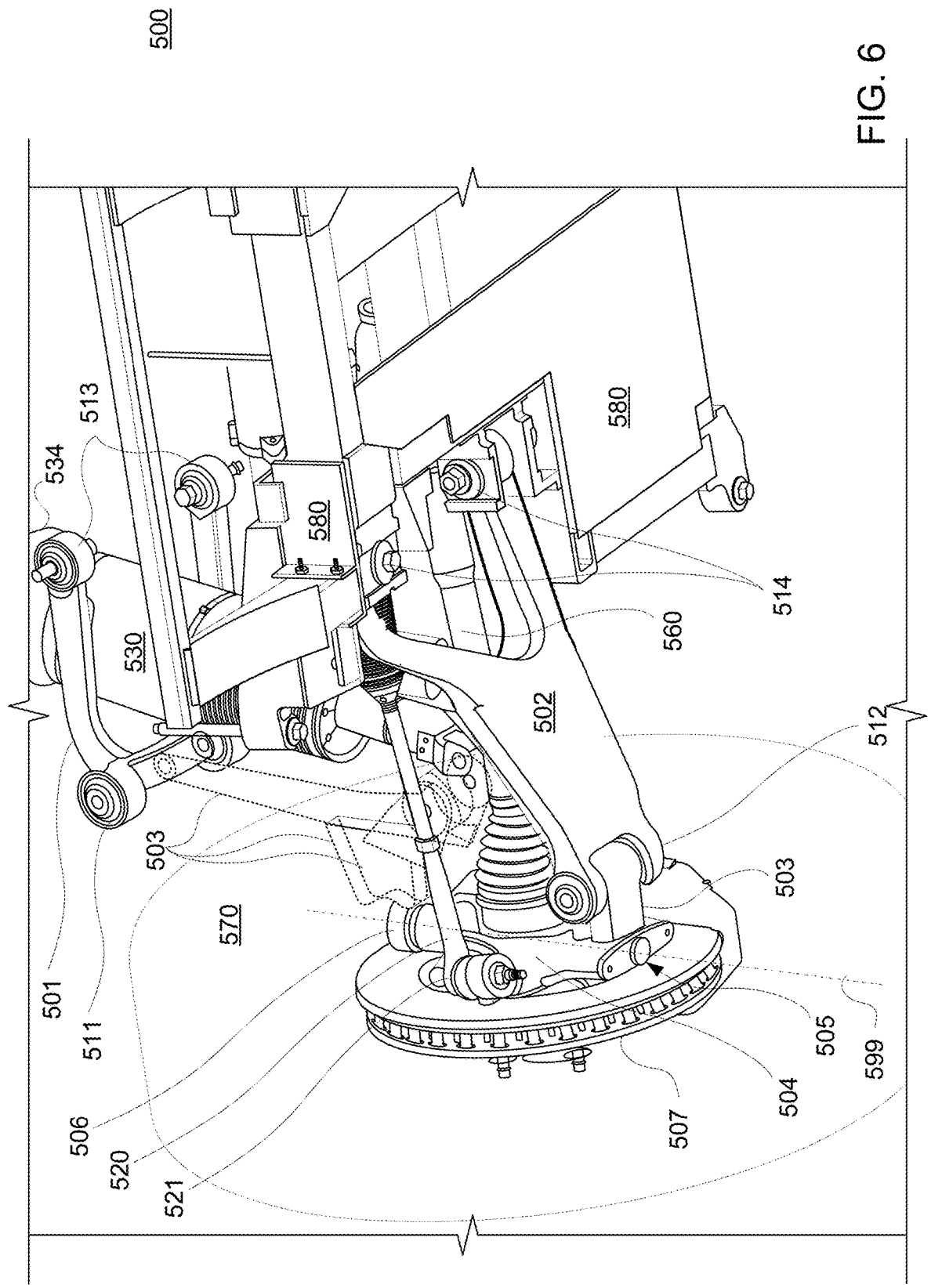
FIGS. 6 and 7 each show a perspective view, from below, of a portion of the illustrative vehicle of FIG. 5, in accordance with some embodiments of the present disclosure.
Figure 7:
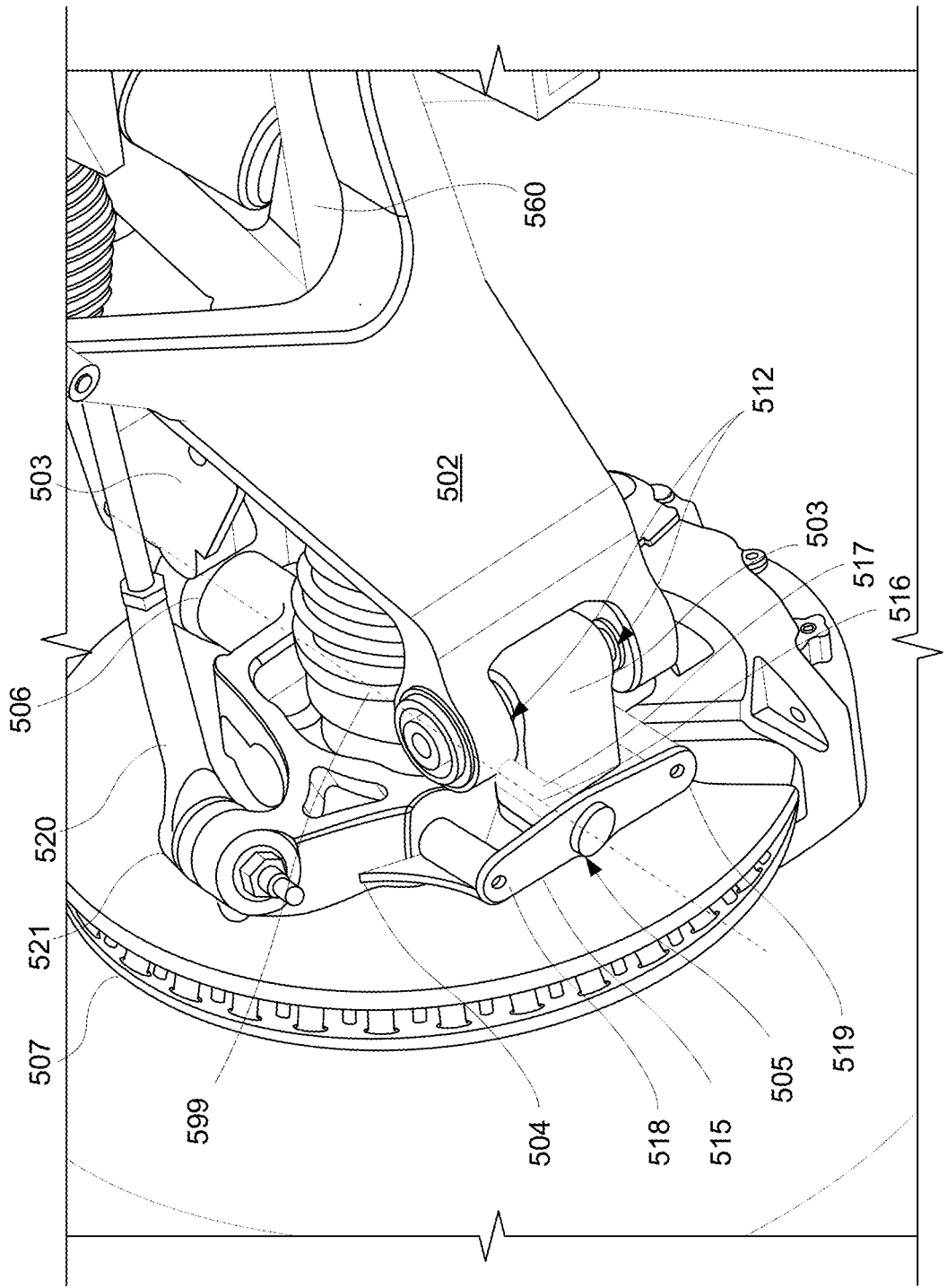

FIG. 5 shows a perspective view, from above, of a portion of an illustrative vehicle 500 having an offset steering axis knuckle 504, in accordance with some embodiments of the present disclosure. FIGS. 6 and 7 each show a perspective view, from below, of a portion of illustrative vehicle 500 of FIG. 5, in accordance with some embodiments of the present disclosure. As illustrated in FIGS. 5-7, the chassis of vehicle 500 includes upper control arm 501 (shown in FIG. 6 but not shown in FIGS. 5 and 7), lower control arm 502, inner knuckle 503 (of which a portion is illustrated and a portion is not shown to allow some parts to be shown), steering knuckle 504, steering joints 505 and 506, tie rod 520 with joint 521 and joint 522 coupled to steering actuator 581, strut assembly 530 (e.g., including stationary element 531 and movable element 532 forming strut joint 533), wheel interface 507 (e.g., a wheel hub, rotor, and/or any other suitable components), drive shaft 560 with joints 561 and 562, and frame 580. Upper joint 511 couples UCA 501 to inner knuckle 503, and may include, for example, a ball joint (e.g., allowing more than one rotational degree of freedom) or a revolute joint (e.g., allowing only a single rotational degree of freedom). Lower joint 512 couples LCA 502 to inner knuckle 503, and may include, for example, a ball joint (e.g., allowing more than one rotational degree of freedom) or a revolute joint (e.g., allowing only a single rotational degree of freedom). Upper control arm 501 includes dual widespread bushings (e.g., at upper joint 511 and joint 513, wherein bushing pairs may be maximally spaced to provide improved torque reaction geometry) to result in a motion similar to a multi-link system. For example, the lengths of LCA 502 and UCA 501 may be tuned (e.g., optimized) for a desired camber gain curve during travel. Joint 521 couples tie-rod 520 to steering knuckle 504, and may include, for example, a ball joint (e.g., allowing more than one rotational degree of freedom) or a revolute joint (e.g., allowing only a single rotational degree of freedom). To illustrate, UCA 501 and LCA 502 may each interface to frame 580 at respective joints 513 and 514, which may be revolute joints (e.g., having one, two, or more than two bushings), ball joints, otherwise flexible joints, or a combination thereof. As illustrated, joint 513 includes two revolute joints with bushings, while joint 514 includes a ball joint and a revolute joint with bushings. Steering joints 505 and 506 couple steering knuckle 504 to inner knuckle 503, allowing rotation of steering knuckle 504 about kingpin axis 599. Steering joints 505 and 506 may each include a ball joint, a revolute joint, or an otherwise flexible joint. For example, as illustrated, joint 505 includes a revolute joint (e.g., a pin and bushing), while joint 506 includes a ball joint, the combination of which are configured to allow some change in caster angle, camber angle, or both, as wheel 501 travels during jounce and rebound (e.g., vertical or nearly vertical travel), steering, acceleration and braking, or otherwise during operation. Wheel interface 507 may include, for example, a bearing interface configured to accommodate a bearing configured for aligning drive shaft 560, wheel 570 (e.g., wheel 570 is affixed or otherwise coupled to a hub illustrated as wheel interface 507), or both As illustrated in FIG. 7, steering joint 505 includes hole 517 (e.g., arranged in inner knuckle 503) and pin assembly 515. Pin assembly 515 includes pin 516 (e.g., aligned with kingpin axis 599) configured to extend through hole 517 of inner knuckle 503 to form a revolute joint (e.g., steering joint 505), and at least one mounting feature (e.g., features 518 and 519) arranged off-axis from pin 516 and configured to be affixed to steering knuckle 504. In an illustrative example, pin assembly 515 may be removed or installed from steering knuckle 504 to allow servicing, decoupling from lower control arm 502 or joint 505, or any other suitable purpose.

In an illustrative example, vehicle 500 may include one or more assemblies for providing suspension and steering. Each assembly may include an inner knuckle (e.g., inner knuckle 503) coupled to an upper control arm (e.g., UCA 501) at an upper joint (e.g., upper joint 511) and a lower control arm (e.g., LCA 502) at a lower joint (e.g., lower joint 512). The upper joint and lower joint define a first axis (e.g., illustrated as axis 297 in FIG. 2). Each assembly also may include a steering knuckle (e.g., steering knuckle 504) coupled to the inner knuckle (e.g., inner knuckle 503) at a steering joint (e.g., steering joints 505 and 506 as illustrated) that defines a kingpin axis (e.g., axis 599). Each steering knuckles (e.g., steering knuckle 504) includes or otherwise forms a tie-rod joint (e.g., tie-rod joint 521) configured to be engaged with a tie-rod (e.g., tie-rod 520), and a wheel interface (e.g., wheel interface 507) configured to mount a wheel (e.g., wheel 507), such that the kingpin axis (e.g., axis 599) is nearer a center of the wheel (e.g., wheel 570) than the first axis. In some embodiments, each assembly includes a strut assembly (e.g., strut assembly 530) affixed to the frame (e.g., frame 580) at a first strut joint (e.g., strut joint 534) and to the inner knuckle (e.g., inner knuckle 503) at a second strut joint (e.g., strut joint 533). In some embodiments, the second strut joint (e.g., strut joint 533) is arranged above a half-shaft (e.g., drive shaft 560) coupled to the wheel (wheel 570), as illustrated in FIGS. 5-7. In some embodiments, although not illustrated in FIGS. 5-7, the strut assembly includes a fork configured to fit around the half-shaft (e.g., drive shaft 560), and the second strut joint is arranged below the half-shaft.

Figure 8:
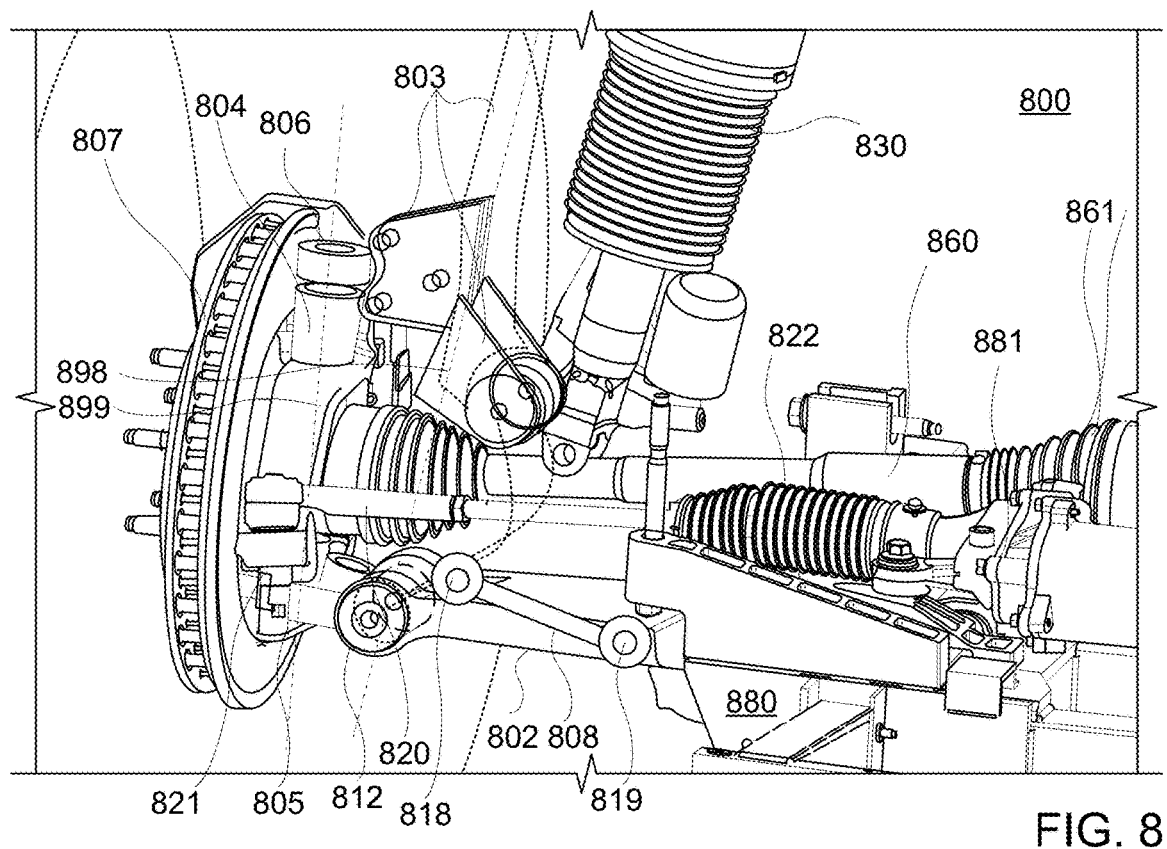
FIG. 8 shows a perspective view, from above, of a portion of an illustrative vehicle having an anti-steer arm coupled to a control arm, in accordance with some embodiments of the present disclosure.

FIG. 8 shows a perspective view, from above, of a portion of illustrative vehicle 800 having anti-steer arm 808 coupled to a control arm, in accordance with some embodiments of the present disclosure. Vehicle 800 may be same as, or similar to, any of the vehicles of FIGS. 1-7, with the addition of anti-steer arm 808. As illustrated, the chassis of vehicle 800 includes an upper control arm (not shown in FIG. 8), lower control arm 802, inner knuckle 803 (of which a portion is illustrated and a portion is not shown to allow some parts to be shown), steering knuckle 804, anti-steering arm 808, steering joints 805 and 806, tie rod 820 with joint 822 and steering actuator 881, strut assembly 830, hub 807, drive shaft 860 with joints 861 and 862, and frame 880. An upper joint couples the UCA to inner knuckle 803, and may include, for example, a ball joint (e.g., allowing more than one rotational degree of freedom) or a revolute joint (e.g., allowing only a single rotational degree of freedom). A lower joint couples LCA 802 to inner knuckle 803, and may include, for example, a ball joint (e.g., allowing more than one rotational degree of freedom) or a revolute joint (e.g., allowing only a single rotational degree of freedom). Joint 821 couples tie-rod 820 to steering knuckle 804, and may include, for example, a ball joint (e.g., allowing more than one rotational degree of freedom) or a revolute joint (e.g., allowing only a single rotational degree of freedom). To illustrate, the UCA and LCA 802 may each interface to frame 880 at respective joints by revolute joints (e.g., having one, two, or more than two bushings), ball joints, otherwise flexible joints, or a combination thereof. Vehicle 800 includes a steering joint having individual steering joints 805 and 806 that couple steering knuckle 804 to inner knuckle 803, allowing rotation of steering knuckle 804 about kingpin axis 899 (e.g., similarly situated as kingpin axis 599). Steering joints 805 and 806 may each include a ball joint, a revolute joint, or an otherwise flexible joint. For example, as illustrated, joint 805 includes a revolute joint (e.g., a pin and bushing), while joint 806 includes a ball joint, the combination of which are configured to allow some change in caster angle, camber angle, or both, as wheel 870 travels during jounce and rebound (e.g., vertical or nearly vertical travel), steering, acceleration and braking, or otherwise during operation.

In an illustrative example, anti-steer arm 808 is coupled to lower control arm 802 at first arm joint 819 and to inner knuckle 803 at second arm joint 818. To illustrate, anti-steer arm 808 is configured to provide stiffness to lower joint 812 against rotation about axis 898 (e.g., defined by upper and lower joints formed by inner knuckle 803 with the upper control arm and lower control arm 802, respectively). In a further illustrative example, not illustrated in FIG. 8, anti-steer arm 808 may be coupled to the upper control arm at a first arm joint and to inner knuckle 803 at a second arm joint, and anti-steer arm 808 may be configured to provide stiffness to the upper joint against rotation about axis 898 (e.g., defined by upper and lower joints formed by inner knuckle 803 with the upper control arm and lower control arm 802, respectively).

In a further illustrative example, an assembly may include inner knuckle 803 is coupled to lower control arm 802 at lower joint 812. The assembly may also include anti-steer arm 808 coupled to lower control arm 802 at first arm joint 819 and to inner knuckle 803 at second arm joint 818. Anti-steer arm 808 is configured to provide stiffness to lower joint 812 against rotation about the axis 898.

Figure 9:
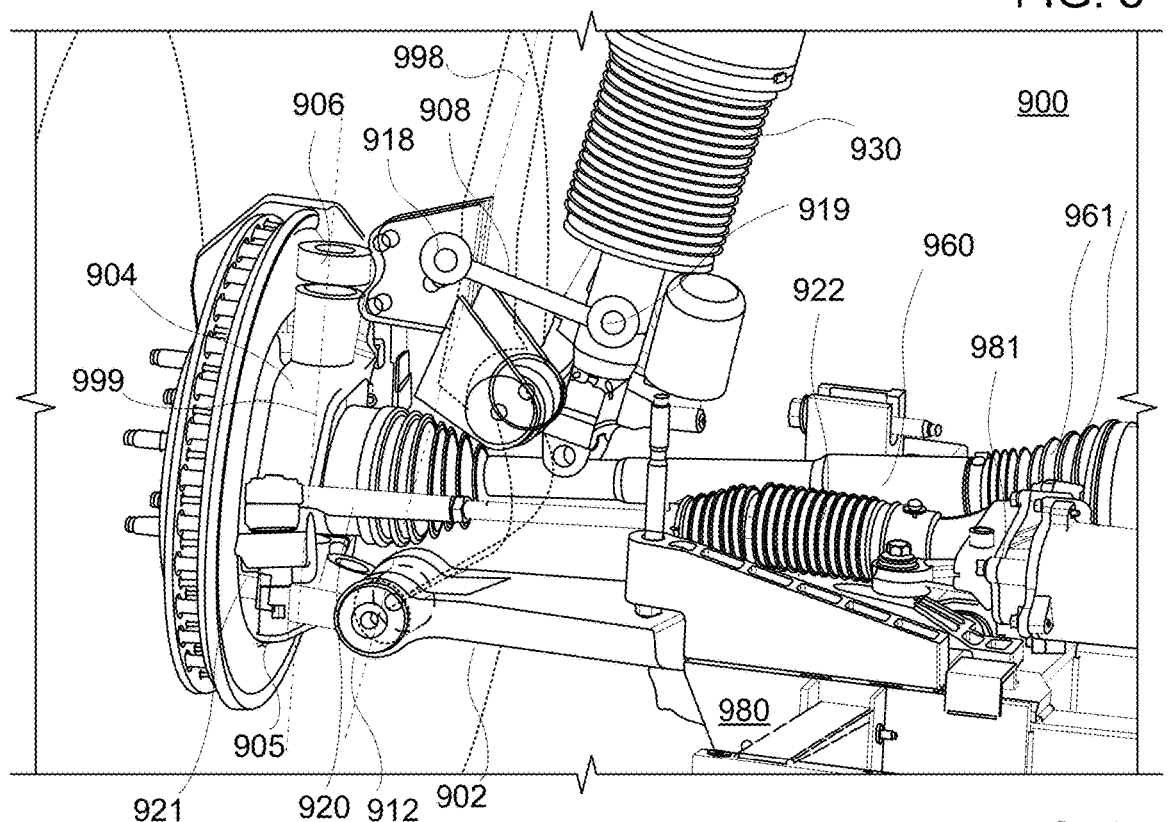
FIG. 9 shows a perspective view, from above, of a portion of an illustrative vehicle having an anti-steer arm coupled to a strut element, in accordance with some embodiments of the present disclosure.

FIG. 9 shows a perspective view, from above, of a portion of illustrative vehicle 900 having an anti-steer arm 908 coupled to a strut element, in accordance with some embodiments of the present disclosure. Vehicle 900 may be same as, or similar to, any of the vehicles of FIGS. 1-7, with the addition of anti-steer arm 908. Further, 900 may be same as, or similar to, vehicle 800 of FIG. 8, with anti-steer arm 908 coupled to strut assembly 930 and inner knuckle 903 rather than between a lower control arm and an inner knuckle (e.g., as illustrated in FIG. 8). As illustrated, the chassis of vehicle 900 includes an upper control arm (not shown in FIG. 9), lower control arm 902, inner knuckle 903 (of which a portion is illustrated and a portion is not shown to allow some parts to be shown), steering knuckle 904, anti-steering arm 908, steering joints 905 and 906, tie rod 920 with joint 922 and steering actuator 981, strut assembly 930, hub 907, drive shaft 960 with joints 961 and 962, and frame 980. An upper joint couples the UCA to inner knuckle 903, and may include, for example, a ball joint (e.g., allowing more than one rotational degree of freedom) or a revolute joint (e.g., allowing only a single rotational degree of freedom). A lower joint couples LCA 902 to inner knuckle 903, and may include, for example, a ball joint (e.g., allowing more than one rotational degree of freedom) or a revolute joint (e.g., allowing only a single rotational degree of freedom). Joint 921 couples tie-rod 920 to steering knuckle 904, and may include, for example, a ball joint (e.g., allowing more than one rotational degree of freedom) or a revolute joint (e.g., allowing only a single rotational degree of freedom). To illustrate, the UCA and LCA 902 may each interface to frame 980 at respective joints by revolute joints (e.g., having one, two, or more than two bushings), ball joints, otherwise flexible joints, or a combination thereof. Vehicle 900 includes a steering joint having individual steering joints 905 and 906 that couple steering knuckle 904 to inner knuckle 903, allowing rotation of steering knuckle 904 about kingpin axis 999 (e.g., similarly situated as kingpin axis 599 or 899). Steering joints 905 and 906 may each include a ball joint, a revolute joint, or an otherwise flexible joint. For example, as illustrated, joint 905 includes a revolute joint (e.g., a pin and bushing), while joint 906 includes a ball joint, the combination of which are configured to allow some change in caster angle, camber angle, or both, as wheel 970 travels during jounce and rebound (e.g., vertical or nearly vertical travel), steering, acceleration and braking, or otherwise during operation.

In an illustrative example, anti-steer arm 908 is coupled to strut assembly 930 at first arm joint 919 and to inner knuckle 903 at second arm joint 918. To illustrate, anti-steer arm 908 is configured to provide stiffness to inner knuckle 903 against rotation about axis 998 (e.g., defined by upper and lower joints formed by inner knuckle 903 with the upper control arm and lower control arm 902, respectively). In some embodiments, strut assembly 930 may couple to inner knuckle 903 above or below drive shaft 960. In some embodiments, strut assembly 930 may include a fork that extends around and below drive shaft 960, coupling to lower control arm 902 or inner knuckle 903 at a suitable strut joint.

Figure 10:
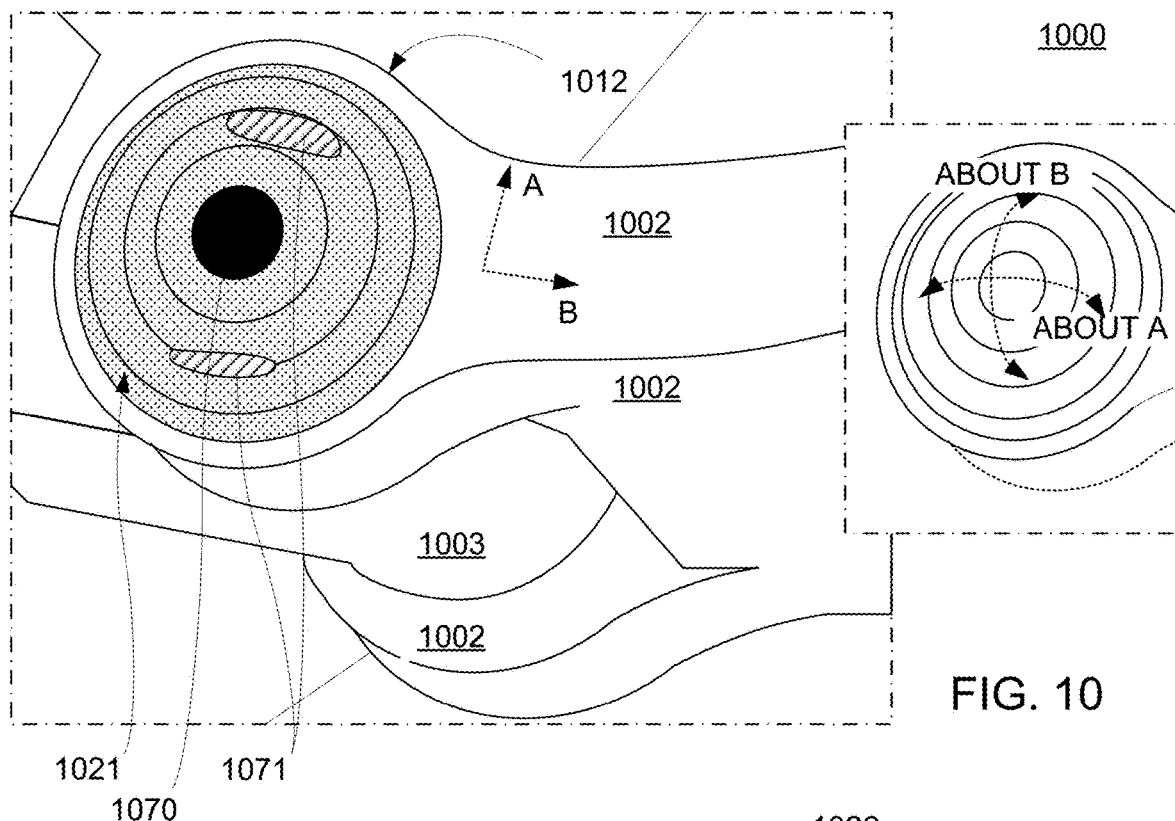
FIG. 10 shows a perspective view, from below, of a portion of an illustrative vehicle having a revolute joint between an inner knuckle and a control arm, in accordance with some embodiments of the present disclosure.
Figure 11:
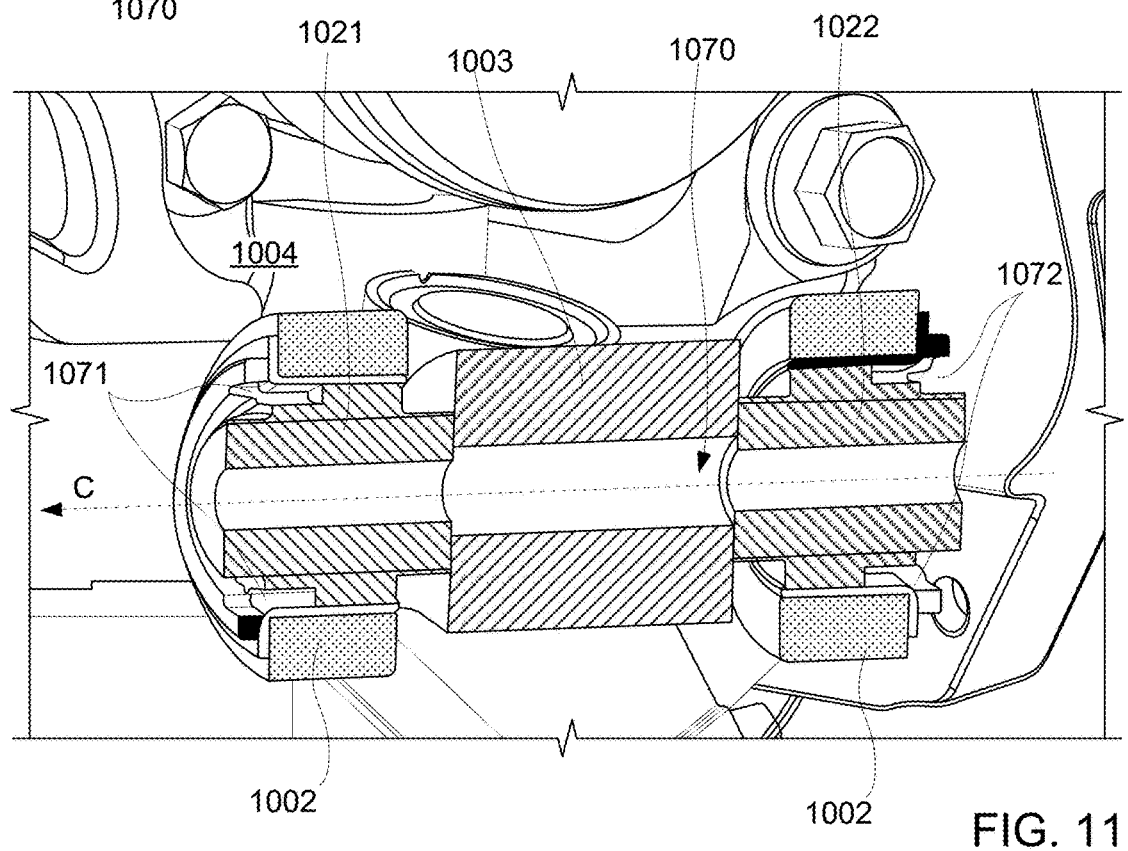
FIG. 11 shows a perspective cross-sectional view of the revolute joint of FIG. 10, in accordance with some embodiments of the present disclosure.

FIG. 10 shows a perspective view, from below, of a portion of illustrative vehicle 1000 having a revolute joint 1012 between inner knuckle 1003 and control arm 1002, in accordance with some embodiments of the present disclosure. Axes A and B are indicated in FIG. 10, while axis C (e.g., the primary axis of rotation for joint 1012) is indicated in FIG. 11. FIG. 11 shows a perspective cross-sectional view of revolute joint 1012 of FIG. 10, in accordance with some embodiments of the present disclosure. Although control arm 1002 is illustrated as a lower control arm in FIGS. 10-11, control arm 1002 may be a lower control arm or an upper control arm. For example, a vehicle may include a joint similar to revolute joint 1012 arranged between an inner knuckle and a lower control arm, an inner knuckle and an upper control arm, or both. As illustrated, revolute joint 1012 includes bushings 1021 and 1022 that couple control arm 1002 to inner knuckle 1003. Center recess 1070 (e.g., a through, cylindrical hole) is configured to receive a pin, bolt, or other cylindrical element to constrain displacement between control arm 1002 and inner knuckle 1003 to be rotational about axis C (e.g., with some limited displacement off of axis C based on the stiffness of bushings 1021 and 1022). Features 1071 and 1072, as illustrated, include blind recesses that are configured to lessen stiffness to rotation about the B axis (e.g., to accommodate some caster variation), while maintaining stiffness against rotation about the A axis (e.g., a potential steering axis). A bushing may include one or more features that modify stiffness of a bushing or bushing set against displacement along one or more degrees of freedom. For example, bushings 1021 and 1022 (e.g., a bushing pair) may be tuned (e.g., directionally tuned) to provide specific characteristics (e.g., stiffness, resistance, inertia) in all six degrees of freedom. As illustrated, features 1071 and 1072 form revolute joint 1012, allowing some flexing as caster varies (e.g., during jounce and rebound) but preventing or significantly limiting displacement about axis A (e.g., to limit steering rotation to the kingpin axis formed by a steering knuckle). Features, such as features 1071 and 1072, may include holes (e.g., through or blind, of any suitable cross-sectional shape), pockets (e.g., closed recesses), a separate embedded material, an altered geometric property (e.g., a reduced diameter or thickness), any other suitable of relief or modification affecting stiffness, or any combination thereof. Each of bushings 1021 and 1022 are made of a suitable material such as rubber, polyurethane, any other suitable plastic, any other suitable material, or any combination thereof. In some embodiments, a metal or plastic sleeve may be included in center recess 1070 to interface to a bolt or pin (e.g., to constrain translation about any of axes A, B, or C). Bushings 1021 and 1022 (e.g., a wide-spread bushing pair) are configured to improve mobility stiffness of inner knuckle 1003 against steering or torque induced forces.

In an illustrative example, a lower joint such as lower joint 1012 or 512 of FIGS. 5-7 may include one or more bushings, such as bushings 1021 and 1022. As illustrated, bushing 1021 is arranged at a front portion of lower joint 1012 (e.g., near the front of vehicle 1000), and bushing 1022 is arranged at a rear portion of lower joint 1012 (e.g., near the rear of vehicle 1000). In a further illustrative example, a lower joint such as lower joint 1012 or 512 of FIGS. 5-7 may include one or more bushings such as bushings 1021 and 1022 having a larger stiffness to rotation about an axis defined by upper and lower joints (e.g., a vertical or near vertical axis such as axis A in FIG. 10) than rotation about a lateral axis (e.g., axis B in FIG. 10). In a further illustrative example, a lower joint, such as lower joint 1012 or 512 of FIGS. 5-7, may include one or more bushings, such as bushings 1021 and 1022, having at least one recess, such features 1071 or 1072, that cause the lower bushing to have the larger stiffness to rotation about an axis defined by upper and lower joints (e.g., a vertical or near vertical axis such as axis A in FIG. 10) than rotation about the lateral axis (e.g., axis B in FIG. 10).

In an illustrative example referencing FIGS. 5-7 and 10-11, in some embodiments, the present disclosure is directed to an assembly include upper control arm 501, lower control arm 502, inner knuckle 503, and steering knuckle 504. For example, upper control arm 501 is configured to rotate about joint 513 formed with frame 580 or a frame element thereof. Further, lower control arm 502 is configured to rotate about joint 514 with frame 580 or a frame element thereof. Inner knuckle 503 is configured to form upper joint 511 with upper control arm 501 and form lower joint 512 with lower control arm 502. To illustrate, inner knuckle 502, upper control arm 501, and lower control arm 502 form a double wishbone suspension arrangement. Steering knuckle 504 is coupled to inner knuckle 503 at a steering joint (e.g., the combination of steering joints 505 and 506), which define a kingpin axis. Steering knuckle 504 is configured to interface to wheel 570, and is configured to form a tie-rod joint with tie-rod 520 for steering wheel 570. In some embodiments, lower joint 1012, which may be the same as lower joint 512, includes bushings 1021 and 1022 having a larger stiffness to rotation about a vertical axis (e.g., axis A in FIG. 10) than rotation about a lateral axis (e.g., axis B in FIG. 10).

Figure 12:
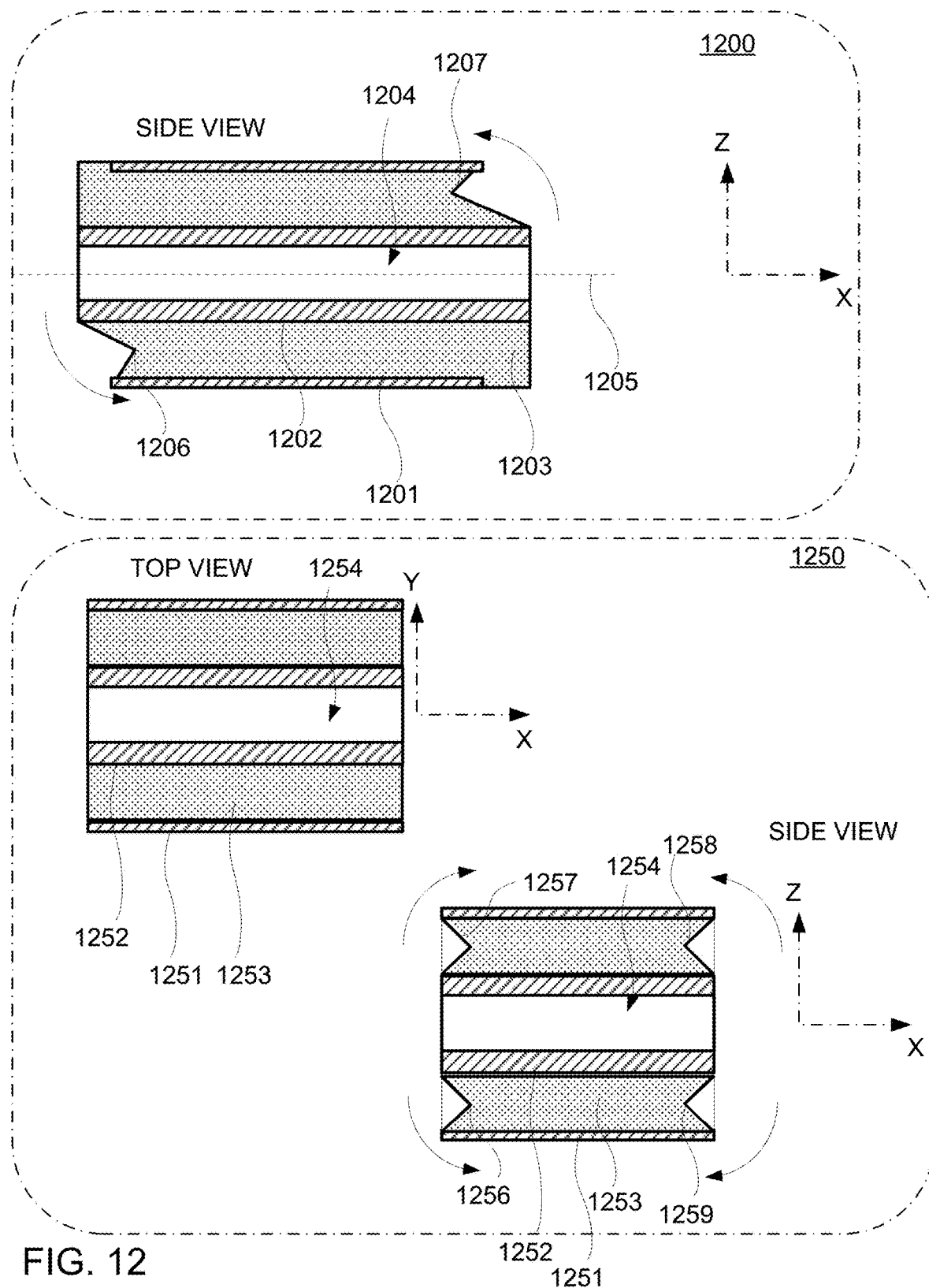
FIG. 12 shows side cross-sectional views of several bushings for forming a revolute joint between an inner knuckle and a control arm, in accordance with some embodiments of the present disclosure.

FIG. 12 shows side cross-sectional views of several bushings for forming a revolute joint between an inner knuckle and a control arm (e.g., an upper or lower control arm), in accordance with some embodiments of the present disclosure. Bushings 1200 and 1250 are examples of OSAK bushings (e.g., for modifying or adding pitch rate).

Bushing 1200 (shown in cross-section from a side view) includes interface 1201, interface 1202, and material 1203 (e.g., a suitable compliant material having a suitable stiffness and flexibility), arranged about axis 1205 (e.g., the same as axis X, normal to axis Y), which is an axis of rotation for the revolute joint (e.g., an upper or lower joint between an inner knuckle and control arms). Bushing 1200 includes an asymmetric stiffness achieved by recesses 1206 and 1207 in material 1203. The curved arrows in FIG. 12 illustrate the lessened stiffness to rotation of interface 1202 (e.g., a pin or component arranged therein joined to an inner knuckle) relative to interface 1201 (e.g., joined to a lower or upper control arm). In some embodiments, bushing 1200 is configured to allow wheel rate in jounce or rebound to be controlled independently. For example, bushing 1200 may reduce acceleration-induced pitch by aligning the stiffer section of bushing 1200 with the vector/direction of rebound experienced by a front axle.

Bushing 1250 (shown in cross-section from both a top view and a side view) includes interface 1251, interface 1252, and material 1253 (e.g., a suitable compliant material having a suitable stiffness and flexibility), arranged about axis X (e.g., normal to axes Y and Z), which is an axis of rotation for the revolute joint (e.g., an upper or lower joint between an inner knuckle and control arms). Bushing 1250 includes an asymmetric stiffness achieved by recesses 1256-1259 in material 1253. The curved arrows in FIG. 12 illustrate the lessened stiffness to rotation of interface 1252 (e.g., a pin or component arranged therein joined to an inner knuckle) relative to interface 1251 (e.g., joined to a lower or upper control arm). In some embodiments, bushing 1250 is configured to allow wheel rate in jounce or rebound to be controlled using recesses 1256-1259, while maintaining stiffness against steering (e.g., about axis Z). For example, bushing 1250 may allow caster to vary during jounce and rebound, while preventing or resisting steering about an upper or lower joint of an inner knuckle. In some embodiments, recesses 1256-1259, or other features lessening the stiffness of material 1253, are configured to reduce stiffness against applied torque in the X-Z plane. For example, the X-Z plane may be aligned to the jounce travel plane to induce the least, or an otherwise reduced, amount of conical spring rate such that the overall wheel rate is impacted the least, or in an otherwise reduced amount, from caster wind up arising from jounce travel (e.g., to avoid energy stored in material 1253 or other elastic deformation). Alternatively, an asymmetric recess section geometry may be included in bushing either of bushing 1200 or 1250 to resist a particular motion. For instance, the rebound direction wheel rate could be increased by stiffening the conical articulation in this direction while maintaining a lower conical rate for the jounce direction. In some embodiments, the Y-X plane (e.g., the horizontal plane) may be aligned to the plane having the most lateral force on bushing 1250 to counteract steering. For example, if over-steer conditions arise, bushing 1250 may include a precise control anti-steering rotational/steering bumper section to engage and counteract steering (e.g., a bump-stop or hard-stop to limit rotation or rotational displacement).

The use of an OSAK bushing provides the opportunity to constrain or over-constrain an inner knuckle in a preferred axis, thus adding a binding anti-feature at the inner knuckle (e.g., to prevent or limit steering but allow some rotational displacement in some degrees of freedom based on the bushing stiffness). In some embodiments, bushing 1200 or 1250 is sized based on vertical forces or rate along with (e.g., in series with) properties of a spring, strut assembly, tire, other bushings, other joints, or a combination thereof. In some embodiments, the bushing 1200 or 1250 is sized or otherwise designed based on an amount of allowable instability (e.g., based on a modified stiffness) to wheel control, whether a cross-axis ball joint is included, or a combination thereof.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An assembly for a vehicle, the assembly comprising:
   an inner knuckle coupled to an upper control arm at an upper joint and to a lower control arm at a lower joint, wherein the upper joint and lower joint define a first axis and wherein the inner knuckle comprises a hole;
   a steering knuckle coupled to the inner knuckle at a steering joint that defines a kingpin axis, wherein the kingpin axis passes through the steering knuckle nearer to a centerline of a vehicle wheel than the first axis; and
   a pin assembly comprising (i) a pin configured to extend into the hole aligned with the kingpin axis to form the steering joint and (ii) at least one mounting feature arranged off of the kingpin axis, wherein when the pin assembly is removed, the steering knuckle is capable of being decoupled from the inner knuckle.

2. The assembly of claim 1, wherein the lower joint comprises:
   a first bushing arranged at a front portion of the lower joint; and
   a second bushing arranged at a rear portion of the lower joint.

3. The assembly of claim 1, wherein the lower joint comprises a lower bushing configured to provide a relatively lower conical stiffness for allowing minimal vertical wheel rate contribution.

4. The assembly of claim 3, wherein the lower bushing comprises at least one recess that causes the lower bushing to have the greater stiffness to rotation about the first axis than rotation about a lateral axis passing through the lower bushing.

5. The assembly of claim 1, wherein the lower joint comprises a lower revolute joint, and wherein the upper joint comprises an upper revolute joint.

6. The assembly of claim 1, wherein the upper joint comprises an upper bushing having a greater stiffness to rotation about the first axis than rotation about a lateral axis along a spindle.

7. The assembly of claim 1, further comprising an anti-steer arm coupled to the lower control arm at a first arm joint and to the inner knuckle at a second arm joint, wherein the anti-steer arm is configured to provide stiffness to the lower joint against rotation about the first axis.

8. The assembly of claim 1, wherein the upper joint and the lower joint are each configured to provide:
   low conical stiffness around a longitudinal axis to allow for minimal vertical wheel rate contribution to caster change with jounce travel;
   high conical stiffness in the horizontal plane to minimize toe compliance; and
   high radial stiffness to minimize camber compliance.

9. The assembly of claim 1, further comprising a strut assembly affixed to a frame element of the vehicle at a first strut joint, wherein a second strut joint affixes the strut assembly to the inner knuckle.

10. The assembly of claim 1, further comprising a strut assembly affixed to a frame element of the vehicle at a first strut joint and to the lower control arm at a second strut joint.

11. The assembly of claim 10, wherein the strut assembly comprises a fork configured to fit around a half-shaft coupled to the wheel, and wherein the second strut joint is arranged below the half-shaft.

12. The assembly of claim 1, wherein the upper joint and the lower joint are configured to limit steering of the inner knuckle to reduce the need for an anti-steer link.

13. The assembly of claim 1, wherein the steering joint comprises a ball joint and a revolute joint that define the kingpin axis.

14. The assembly of claim 1, wherein the upper joint and the lower joint allow caster of the inner knuckle to vary during jounce travel of the inner knuckle.

15. A vehicle comprising:
   a first control arm assembly for coupling a first front wheel to a frame, wherein the first control arm assembly comprises:
      a first inner knuckle coupled to a first pair of control arms at an upper joint and at a lower joint, wherein the inner knuckle comprises a hole,
      a first steering knuckle coupled to the first inner knuckle, wherein the first steering knuckle is configured to rotate about a first kingpin axis, and
      a pin assembly comprising (i) a pin configured to extend into the hole aligned with the first kingpin axis to form a steering joint and (ii) at least one mounting feature arranged off of the first kingpin axis, wherein when the pin assembly is removed, the first steering knuckle is capable of being decoupled from the first inner knuckle; and
   a second control arm assembly for coupling a second front wheel to the frame, wherein the second control arm assembly comprises:
      a second inner knuckle coupled to a second pair of control arms, and
      a second steering knuckle coupled to the second inner knuckle, wherein the second steering knuckle is configured to rotate about a second kingpin axis.

16. The vehicle of claim 15, wherein the first inner knuckle coupled to a first pair of control arms at a pair of revolute joints, and wherein the first steering knuckle is coupled to the first inner knuckle by a revolute joint and a ball joint.

17. The vehicle of claim 15, further comprising a steering assembly coupled to the first steering knuckle and to the second steering knuckle by respective tie-rods.

18. A system comprising:
   an upper control arm configured to rotate about a first joint with a frame;
   a lower control arm configured to rotate about a second joint with the frame, wherein the upper control arm and lower control arm;
   an inner knuckle configured to form an upper joint with the upper control arm and form a lower joint with the lower control arm, wherein the inner knuckle comprises a hole;

a steering knuckle coupled to the inner knuckle at a steering joint that defines a kingpin axis, wherein the steering knuckle is configured to interface to a wheel, wherein the upper joint is arranged above the steering knuckle, and wherein the steering knuckle is configured to form a tie-rod joint with a tie-rod for steering the wheel; and a pin assembly comprising (i) a pin configured to extend into the hole aligned with the kingpin axis to form the steering joint and (ii) at least one mounting feature arranged off of the kingpin axis, wherein when the pin assembly is removed, the steering knuckle is capable of being decoupled from the inner knuckle.

19. The system of claim 18, wherein the lower joint comprises a bushing having a greater stiffness to rotation about an axis defined by the upper joint and the lower joint than rotation about a lateral axis passing through the lower bushing.

\* \* \* \* \*